United States Patent
Jeong et al.

(10) Patent No.: US 6,445,107 B1
(45) Date of Patent: Sep. 3, 2002

(54) SINGLE STAGE MICROACTUATOR FOR MULTI-DIMENSIONAL ACTUATION

(75) Inventors: Hee-moon Jeong; Jong Up Jeon; Jae-joon Choi, all of Yongin (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/682,085

(22) Filed: Jul. 18, 2001

(30) Foreign Application Priority Data

Jul. 18, 2000 (KR) ........................................ 2000-40985

(51) Int. Cl.$^7$ ................................................ H02N 1/00
(52) U.S. Cl. ...................................................... 310/309
(58) Field of Search ........................... 310/309; 318/116

(56) References Cited

U.S. PATENT DOCUMENTS

| | | | |
|---|---|---|---|
| 5,375,033 A | * 12/1994 | MacDonald | ................ 310/309 |
| 5,536,988 A | 7/1996 | Zhang et al. | |
| 5,801,472 A | 9/1998 | Wada et al. | |
| 5,862,003 A | * 1/1999 | Saif et al. | .................... 359/223 |
| 5,986,381 A | * 11/1999 | Hoen et al. | .................. 310/309 |

FOREIGN PATENT DOCUMENTS

| | | |
|---|---|---|
| EP | 0 903 606 A | 3/1999 |
| EP | 0 907 076 A | 4/1999 |
| WO | 99 12002 A | 3/1999 |

OTHER PUBLICATIONS

P.F. Intermuehle et al., "Design and Fabrication of an Overhanging xy–miroactuator with Integrated Tip for Scanning Surface Profiling", Sensors and Actuators A. 43 (1994) 346–350.

* cited by examiner

*Primary Examiner*—Karl Tamai
(74) *Attorney, Agent, or Firm*—Burns, Doane, Swecker & Mathis, LLP

(57) ABSTRACT

A single-stage microactuator is provided. The single-stage microactuator includes: a substrate; a fixed plate electrode disposed at a central portion of the substrate; a rectangular stage having first and second side directions, which is located above the fixed plate electrode, the second direction being perpendicular to the first direction; a plurality of actuating frame parts provided corresponding to the two first direction of sides and the two second direction of sides for regions surrounding the stage, wherein each actuating frame includes a plurality of actuating frames arranged parallel to a corresponding side of the stage adjacent to each surrounding region; a plurality of comb normal directional deformable spring parts, each disposed between each side of the stage and the inner part of each actuating frame part, wherein each comb normal directional deformable spring part includes a plurality of spring members extending in a direction perpendicular to a corresponding side of the stage; a plurality of fixed frame parts, each including a plurality of fixed frames alternately arranged parallel to the plurality of actuating frames of a corresponding actuating frame part of each surrounding region; an actuating comb electrode provided in each actuating frame of the actuating frame part, the actuating comb electrode extending in a direction perpendicular to the side of the stage corresponding to each surrounding region; a fixed comb electrode arranged alternately in parallel to the actuating comb electrode in each fixed frame of the fixed frame part; and a plurality of comb directional deformable spring parts disposed on one side of each actuating frame part opposite the stage and the opposing side thereof for providing an elastic recovery force in a direction perpendicular to one side of the stage corresponding to each of the surrounding regions. The microactuator is capable of multi-dimensional actuation using a single electrode in an actuating part and of simplifying a fabrication process without an isolation process step.

20 Claims, 6 Drawing Sheets

SINGLE STAGE MICROACTUATOR FOR MULTI-DIMENSIONAL ACTUATION

BACKGROUND OF INVENTION

1. Field of the Invention

The present invention relates to a single stage microactuator for multidimensional actuation, and more particularly, to an X-Y stage microactuator for use in a data storage system employing scanning probe microscope (SPM) techniques.

2. Description of the Related Art

A data storage system using SPM techniques mainly includes a medium fo rstorage, an actuator for mounting the medium to a stage and driving it in x and y directions, one or more probes each having a tip for storing or reading information on or from the medium, and a signal processor for processing such information signals. The multiple probes can store or read data at one time, and to accomplish this, the tip of the probe must approach the medium. Thus, the probe requires an actuator and a sensor. The actuator deforms the probe in Z direction so that the probe tip approaches the medium, and the sensor senses the deformation of the probe made according to information stored on the medium and reads the relevant information.

To achieve stage actuation along two or more axes in the X-Y plane, the actuator requires at least three electrodes for unidirectional actuation along one axis and at least five electrodes for bidirectional actuation along one axis.

According to U.S. Pat. No. 5,536,988, a microactuator requiring a plurality of electrodes is fabricated from a crystal structure using a thermal oxidation isolation technique to enable multi-dimensional motion. This approach address the electrode problem associated with multi-dimensional actuation, but the process is complicated.

Unlike this approach, in an article presented by P. F. Indermuehle et al., "Design and Fabrication of an Overhanging xy-microactuator With Integrated Tip for Scanning Surface Profiling, Sensors and Actuators A. 43 (1994) pp 346–350, there is a discussion of the use of a single electrode for two-axis actuation although this approach offers a simple process without an isolation process, the use of a single electrode in an actuating part of actuation causes interferences between the two-way actuation. An actuator having the above structure has problems in that the actuator is structurally unstable to allow rotational motion with respect to a vertical axis of an actuating plane such that it cannot be used as an actuator having a large stage for a storage system, and that it suffers from loss of a stage area over the total area of the microactuator due to the length of a spring between the stage and the actuator.

SUMMARY OF INVENTION

To solve the above problems, it is a first object of the present invention to provide a single-stage microactuator which is capable of multi-dimensional actuation with a single electrode in an actuating part and of simplifying a fabrication process without an isolation process step.

It is a second object to provide a single-stage microactuator capable of effectively preventing the motion of a stage other than the X-Y plane of motion.

It is a third object to provide a single-stage microactuator that maximizes the storage capacity with the expansion of a stage area due to effective arrangement of structures.

Accordingly, to achieve the above objects, the present invention provides a single-stage microactuator including: a substrate; a fixed plate electrode disposed at a central portion of the substrate; a rectangular stage having first and second direction of sides, which is located above the fixed plate electrode, the second direction being perpendicular to the first direction; a plurality of actuating frame parts provided corresponding to the two first direction of sides and the two second side directions for regions surrounding the stage, wherein each actuating frame includes a plurality of actuating frames arranged parallel to a corresponding side of the stage adjacent to each surrounding region; a plurality of comb normal directional deformable spring parts, each disposed between each side of the stage and the inner part of each actuating frame part, wherein each comb normal directional deformable spring part includes a plurality of spring members extending in a direction perpendicular to a corresponding side of the stage; a plurality of fixed frame parts, each including a plurality of fixed frames alternately arranged parallel to the plurality of actuating frames of a corresponding actuating frame part of each surrounding region; an actuating comb electrode provided in each actuating frame of the actuating frame part, the actuating comb electrode extending in a direction perpendicular to the side of the stage corresponding to each surrounding region; a fixed comb electrode arranged alternately in parallel to the actuating comb electrode in each fixed frame of the fixed frame part; and a plurality of comb directional deformable spring parts disposed on one side of each actuating frame part opposite the stage and the opposing side thereof for providing an elastic recovery force in a direction perpendicular to one side of the stage corresponding to each of the surrounding regions.

In the single-stage microactuator, the actuating frame of each actuating frame part includes: a first actuating main frame arranged parallel to an adjacent side of the stage; a plurality of actuating sub-frames arranged outwardly from the stage and spaced from and parallel to the first actuating main frame; and a plurality of second actuating main frame extending outward from the stage and connecting the first actuating main frame to the plurality of actuating sub-frames.

Preferably, the fixed frame of each fixed frame part includes a plurality of fixed sub-frames arranged parallel to the first actuating main frame and the plurality of actuating sub-frames; and a plurality of fixed main frames for fixing the fixed sub-frame for each region. Preferably, an area surrounding the stage is partitioned into the surrounding regions by boundary lines extending from the stage in a diagonal direction of the stage, and corresponding actuating and fixed frame parts are arranged in a form corresponding to each surrounding region. It is preferable that the plurality of second actuating main frames are arranged in a direction extending radially from the stage, and the plurality of fixed main frames are arranged in a direction extending radially from the stage.

Furthermore, in the single-stage microactuator, a fixed plate electrode pad is disposed at a portion adjacent to an edge of the substrate, and a line electrode extends in a diagonal direction of the substrate for connecting the fixed plate electrode pad with the fixed plate electrode. Preferably, an actuating frame electrode pad and a fixed frame electrode pad are disposed at outer ends of the second actuating main frame and the fixed main frame, respectively, for applying voltages to the actuating frame part and the fixed frame part, respectively.

BRIEF DESCRIPTION OF DRAWINGS

The above objects and advantages of the present invention will become more apparent by describing in detail preferred embodiments thereof with reference to the attached drawings in which.

DETAILED DESCRIPTION

Figure 1:
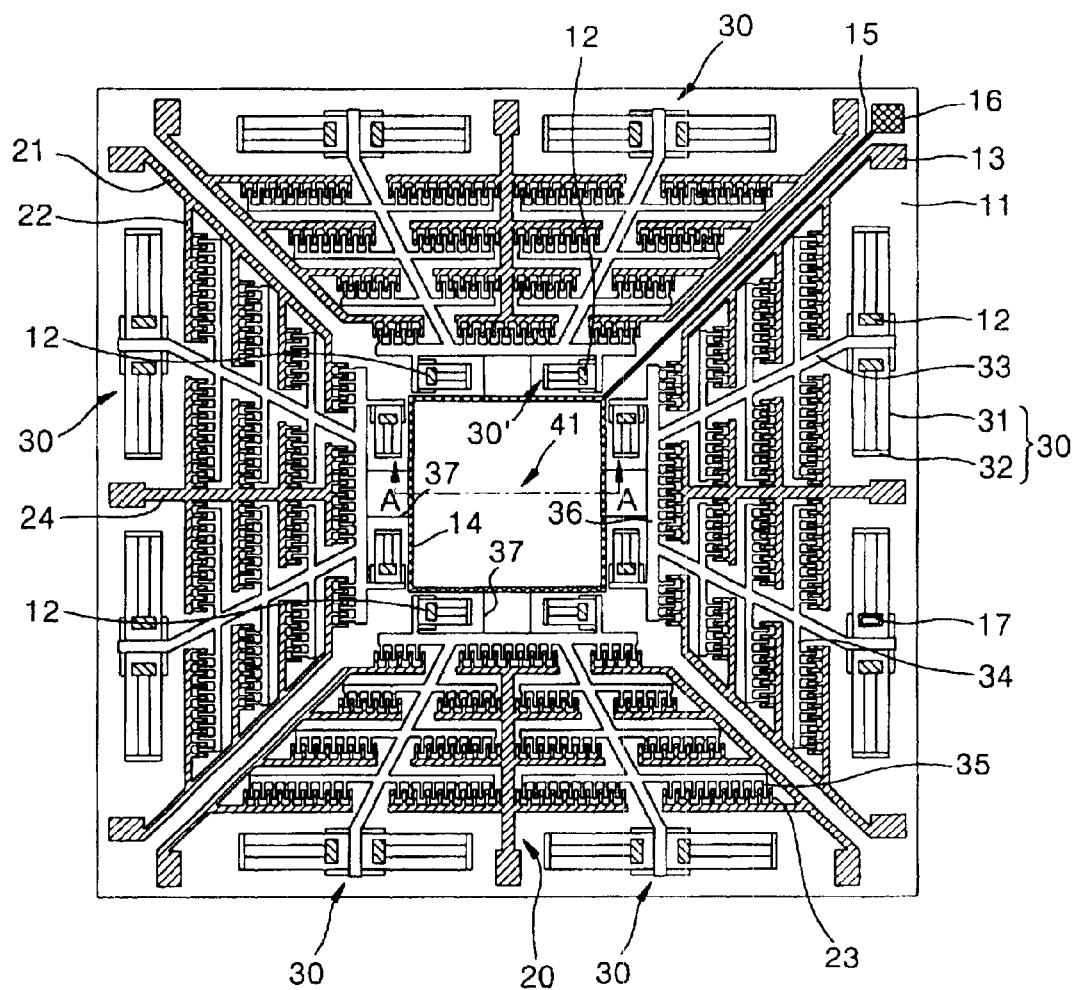
FIG. 1 is a top view of a single-stage microactuator for multi-dimensional actuation according to an embodiment of the present invention.

Referring to FIG. 1, a single-stage microactuator according to the present invention includes a substrate 11, a fixed frame part fixedly attached to the substrate 11, and an actuating frame part corresponding to the fixed frame part, which includes a central rectangular stage 41, and first and second actuating main frames 36 and 33 and an actuating sub-frame 34 surrounding the stage 41. The components of the actuating frame part are spaced apart at a predetermined height by a vertical fixture 12 disposed in comb directional deformable spring parts 30 and 30', which will be described below.

More specifically, the actuating frame part includes the rectangular stage 41 having first and second direction of sides, the second direction being orthogonal to the first direction, the plurality of first actuating main frames 36 spaced apart from and arranged parallel to the first and second direction of sides, a comb normal directional deformable spring 37 disposed between each of the plurality of first actuating main frames 36 and a corresponding side of the stage 41, the plurality of spaced actuating sub-frames 34 arranged radially outward from the stage 41, each being spaced apart from and parallel to each first actuating main frame 36, and the second actuating main frame 33 extending radially outward from the stage 41 for connecting the plurality of first actuating main frames 36 corresponding to the sides of the stage 41 with the plurality of actuating sub-frames 34.

The fixed frame part includes a plurality of fixed sub-frames 22 arranged parallel to the plurality of first actuating main frames 36 and the actuating sub-frame 34 and entirely to the first direction of sides and the second direction of sides of the stage 41, and fixed main frames 21 and 24 extending radially and diagonally outward from the stage 41 for interconnecting the plurality of fixed sub-frames 22 corresponding to the sides of the stage 41.

In the above configuration, an area concentrically surrounding the stage 41 is divided diagonally into four regions having a trapezoidal shape, as shown in FIG. 1, to form the actuating frame part and the fixed frame part conforming to the shape thereof. Moving toward the edge of the substrate 11, the actuating sub-frame 34 of the actuating frame part and the fixed sub-frame 22 of the fixed frame part become longer. In this embodiment, the actuating sub-frame 34 and a corresponding fixed sub-frame 22 located along the same line for each surrounding region are divided into two and three, respectively. Three fixed main frames 21 and 24 and two second actuating main frame 33 for radially interconnecting the actuating sub-frames 34 and the fixed sub-frames, respectively, are provided for each surrounding region by the fixed and actuating sub-frames 22 and 34 configured to separate them into three and two, respectively, for each line.

Figure 2:
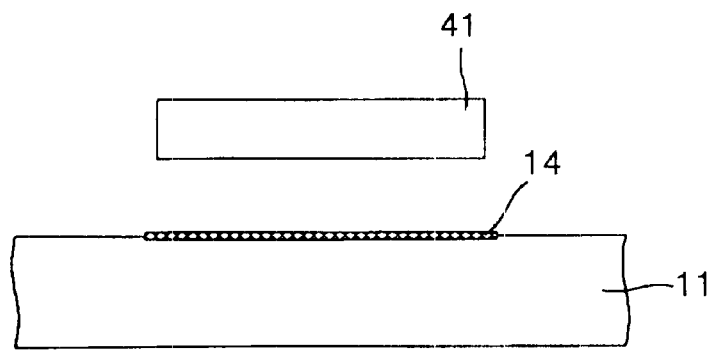
FIG. 2 is a cross-section taken along line A—A of the single-stage microactuator of FIG. 1, which shows the relationship between the stage and the fixed plate electrode.

As in a typical actuator, a plurality of actuating comb electrodes 35 and a plurality of fixed comb electrodes 23 are arranged alternately between each of the actuating frames 34 or 36 and a corresponding fixed sub-frame 22. An actuating part electrode pad 17 is mounted on the fixture 12, a fixed part electrode pad 13 is located at the ends of the fixed main frames 21 and 24, and a fixed plate electrode 14 is placed under the central stage 41 of the substrate 11, as shown in FIG. 2. Furthermore, a fixed plate electrode pad 16 is located on one edge of the substrate 11, and a line electrode 15 for connecting the fixed plate electrode 14 with the fixed plate electrode pad 16 is located therebetween. The line electrode 15 formed in a diagonal direction of the substrate 11 passes between two adjacent two fixed main frames 21.

Figure 3A:
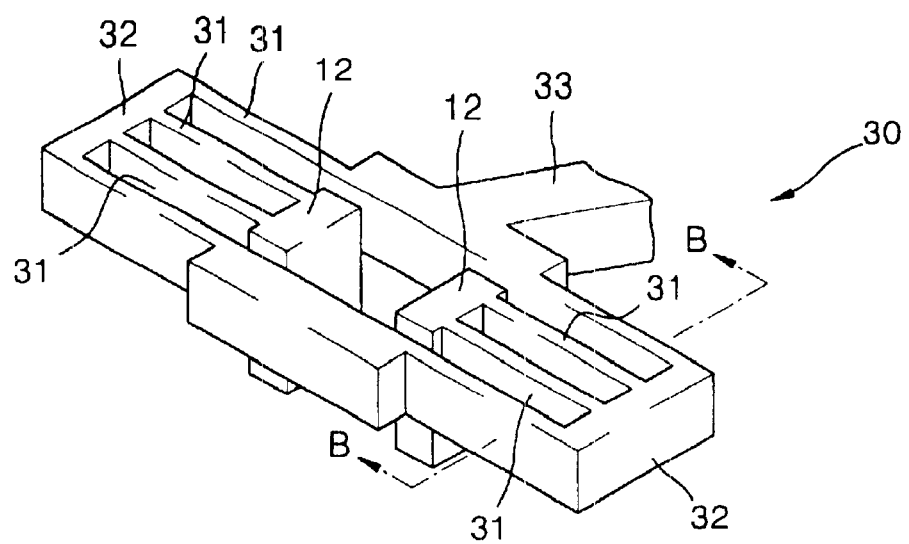
FIG. 3A is a perspective view of the comb directional deformable spring part on the outside of the actuating frame part in the single-stage microactuator for multi-dimensional actuation of FIG. 1.
Figure 3B:
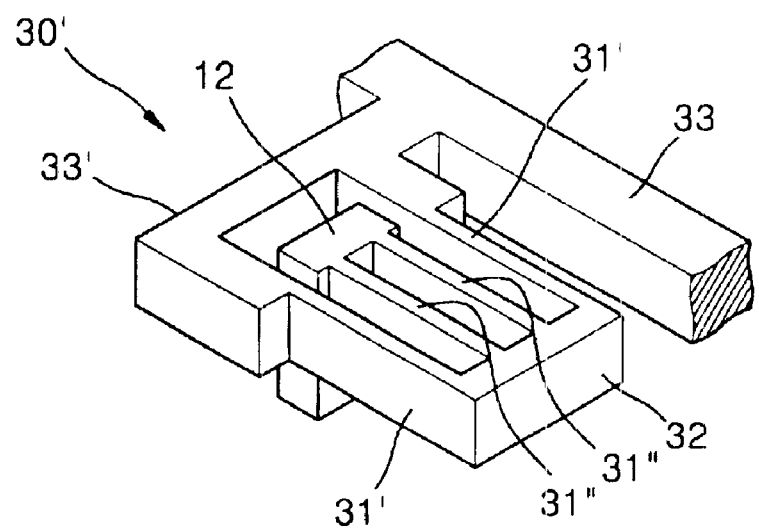
FIG. 3B is a perspective view of comb directional deformable spring part on the inside of the actuating frame part in the single-stage microactuator for multi-dimensional actuation of FIG. 1.
Figure 4:
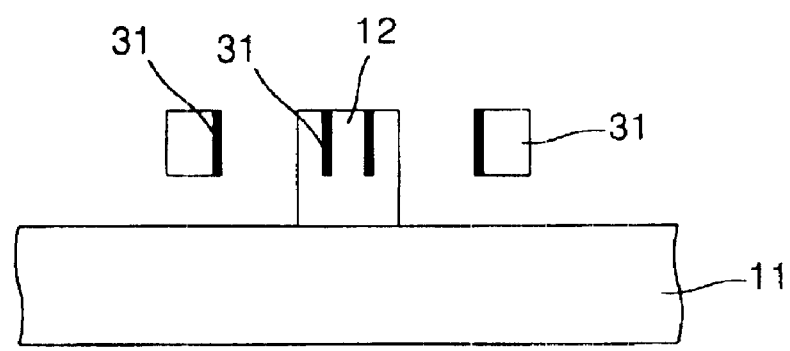
FIG. 4 is a cross-section taken along line B—B of FIG. 3A.
Figure 5:
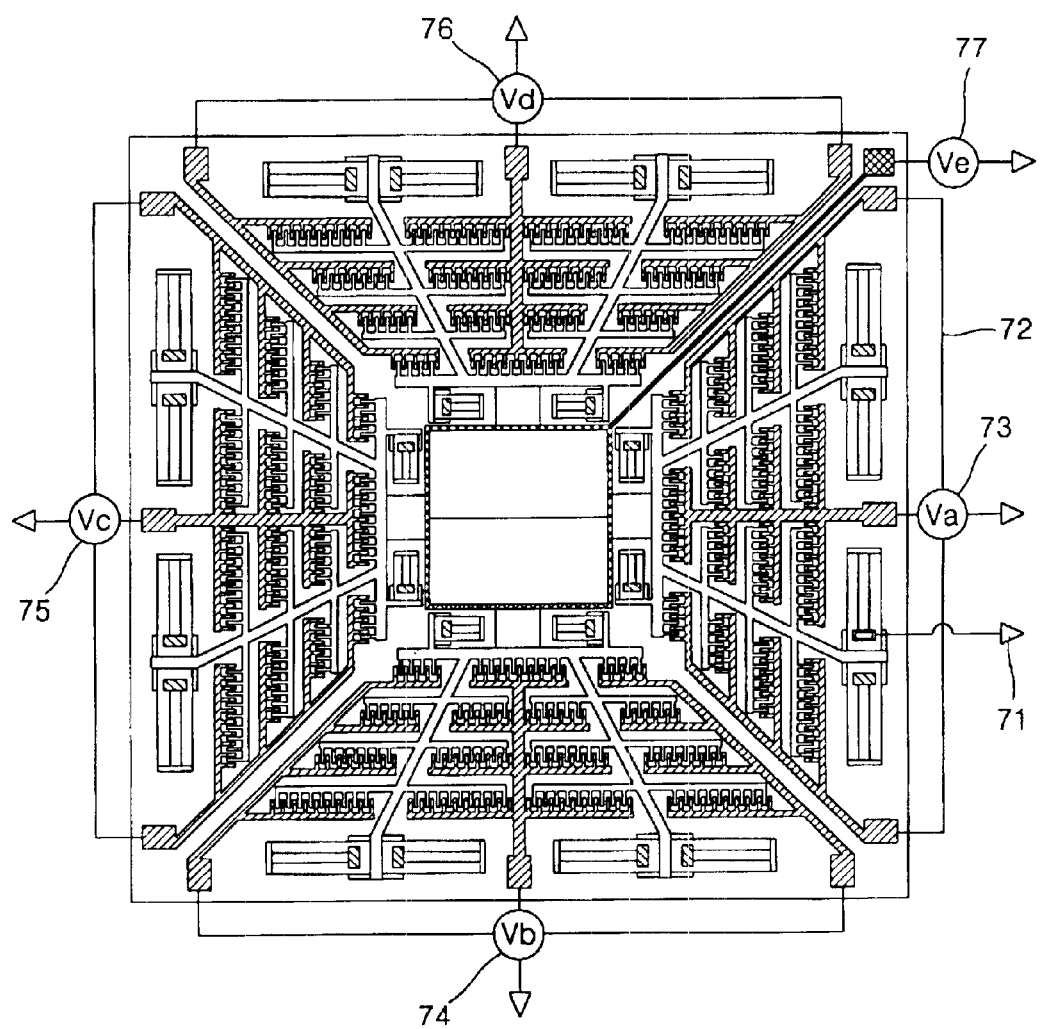
FIG. 5 is a top view showing the structure in which a voltage is applied during operation of a single-stage microactuator for multi-dimensional actuation according to the present invention.

The actuating frame part, which is separated a predetermined height from the substrate 11, is supported at the predetermined height by the fixtures 12 provided in the comb directional deformable spring part 30 and 30' for supporting this. FIG. 3A is a perspective view of the comb directional deformable spring part 30 on the outside of the actuating frame part, and FIG. 3B is a perspective view of the comb directional deformable spring part 30' on the inside of the actuating frame part, that is, between the stage 41 and the actuating frame part. First, referring to FIGS. 3A and 4, the fixture 12 is fixed erect on the substrate 11. Two connecting stands 32 are placed on the outsides of both fixtures 12. Both ends of the spring connecting stand 32 are interconnected by spring members 31. Another two spring members 31 extend from the inside of each spring connecting stand 32 to be fixed to the sides of both fixtures 12. The middle portion of the spring member 31 disposed on the side of the stage 41 is connected to the second actuating main frame 33.

Referring to FIG. 3B, the comb directional deformable spring part 30' for supporting the inside of the actuating frame part includes an extension 33' extending from the second actuating main frame 33. The extension 33' is parallel to the comb normal directional deformable spring 37. Two parallel spring members 31' extending from one side of the extension 33' are connected to both ends of a spring connecting stand 32. A fixture 12 is located between the spring members 31', and another two parallel spring members 31' are located between the fixture 1 2 and the spring connecting stand 32.

An electrostatic force resulting from a voltage difference between the actuating comb electrode 35 and the fixed comb electrode 23 is used to move the stage 41 in the X-Y direction on a plane. An electrostatic force is exerted in four actuating directions, that is, a positive X direction, a negative X direction, a positive Y direction, and a negative Y direction which are right, left, top, and bottom with respect to the stage 41. The magnitudes of the electrostatic force are controlled by voltages 73, 74, 75, and 76 applied between each of the fixed frame electrodes and each of the actuating frame electrodes, which are independently generated in each direction. The magnitudes of an electrostatic force in turn control the distance by which the stage 41 is moved. To prevent the stage 41 from moving in a direction perpendicular to an actuation plane due to gravitation and other external loads, a voltage 77 is applied between the fixed plate electrode 14 and the stage 41 in order to impart an attractive force to the stage 41.

Figure 6:
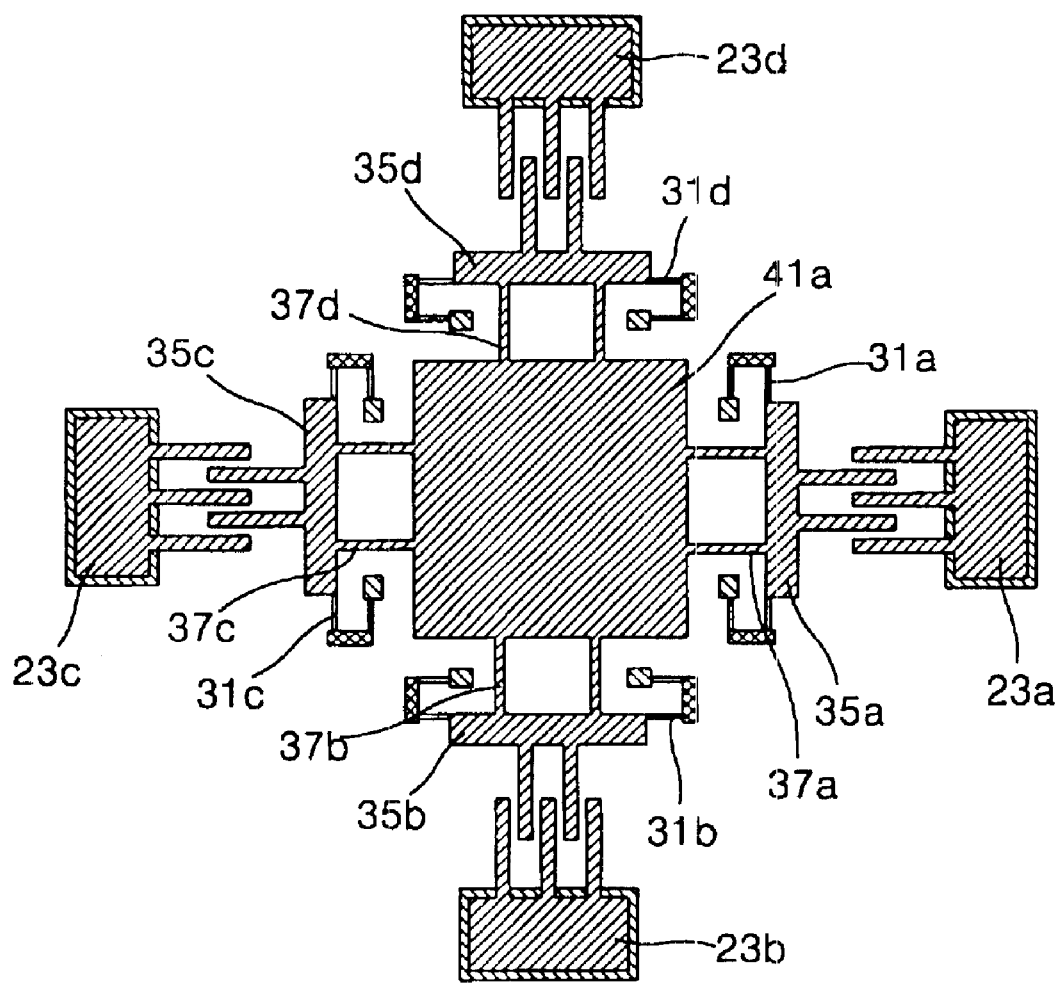
FIG. 6 is a simple model diagram for explaining the principle of operation of a single-stage microactuator for multi-dimensional actuation according to the present invention.
Figure 7:
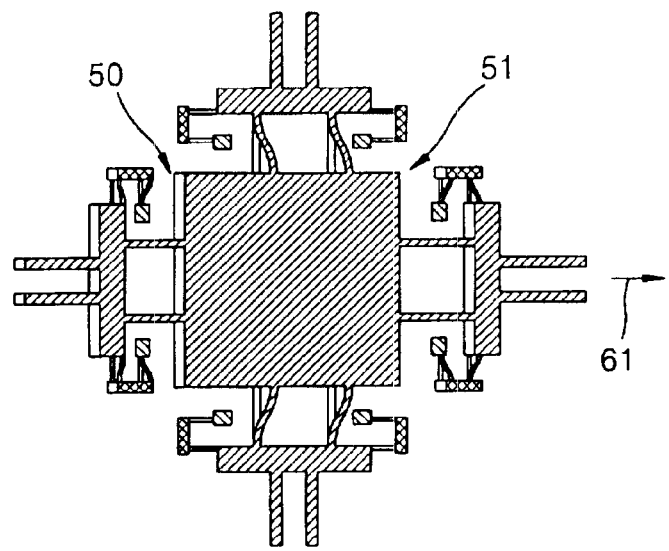
FIG. 7 is a simple model diagram of a single-stage microactuator for multi-dimensional actuation according to the present invention deformed during unidirectional actuation.

FIG. 6 shows a simple model diagram showing the principle of actuating a single stage microactuator in which actuating frames form a single electrode. In the case of actuation in the positive X direction, as shown in FIG. 7, an electrostatic force 61 resulting from a voltage difference between a fixed comb electrode 23a and an actuating comb electrode 35a, both of which are positioned in the positive X direction, enables a stage 41a to be moved in the positive X direction. In this case, a comb directional deformable spring 31a among springs 31a and 37a connected to an actuating main frame 35a positioned in the positive X direction is deformed in the positive X direction to enable the actuating main frame 35a to move in the positive X direction. As the actuating main frame 35a is moved in the positive X direction, a tension force is exerted on a comb normal directional deformable spring 37a parallel to the X direction to enable the stage 41a to be moved in the actuating direction. A comb normal directional deformable spring 37c connected to the stage 41a in the negative X direction is moved with an actuating main frame 35c in the direction in which the stage 41a is moved. On the other hand, comb normal directional deformable springs 37b and 37d connected to the stage 41a in a direction perpendicular to the actuating direction are deformed in the positive X direction along a direction in which the stage 41a is moved. Actuating mainframes 35b and 35d connected to the deformed comb normal directional deformable springs 37b and 37d, respectively, remain at the same locations without movement by comb directional deformable springs 31b and 31d connected to themselves in the positive X direction which is the actuating direction. This is because the stiffness in the X direction of the comb directional deformable springs 31b and 31d connected to the actuating main frames 35b and 35d is significantly higher than that of the comb normal directional deformable springs 37b and 37d.

Figure 8:
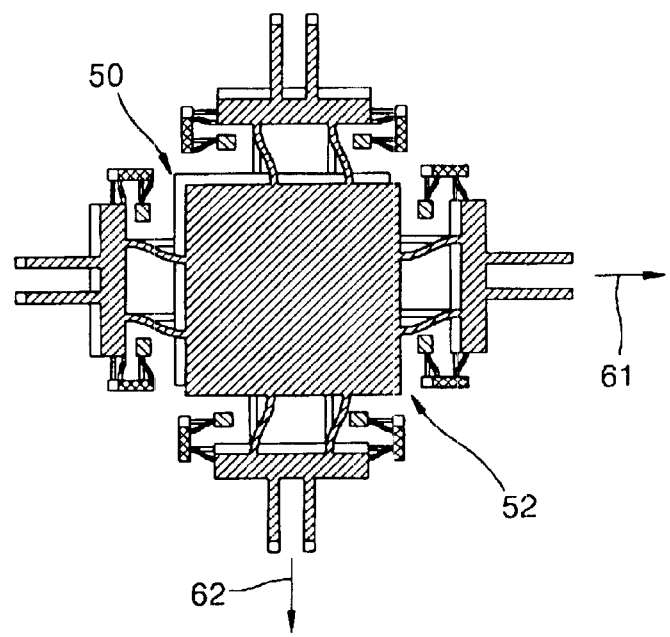
FIG. 8 is a simple model diagram of a single-stage microactuator for multi-dimensional actuation according to the present invention deformed during bidirectional actuation.

FIG. 7 shows the original shape 50 and a deformed shape 51 of the single-stage microactuator actuated in the positive X direction. The same is true of actuation in the Y direction. FIG. 8 shows a deformed shape 52 of a single-stage microactuator when electrostatic forces 61 and 62 are exerted in the positive X direction and the negative Y direction for two-way actuation. In this case, the actuating main frames 35a, 35b, 35c, and 35d are moved in the X or Y direction in which they are placed. The comb direction aide formable springs 31a, 31b, 31c, and 31d for supporting the actuating main frames 35a, 35b, 35c, and 35d are deformed to allow the movement thereof. Also, the comb directional deformable springs 31a, 31b, 31c, and 31d prevents the motion of the actuating main frames 35a, 35b, 35c, and 35d in a direction perpendicular to axes on which they are positioned. However, The comb normal directional deformable springs 37a, 37b, 37c, and 37d connecting the stage 41a with the actuating main frames 35a, 35b, 35c, and 35d, respectively, are deformed in a direction perpendicular to axes on which they are positioned and further affected by a tensile force in their axis direction, thereby providing two-way actuation of the stage 41a. In this case, the comb normal directional deformable springs 37a, 37b, 37c, and 37d are deformed in a direction perpendicular to a longitudinal direction thereof, and at the same time, affected by a tensile force in the longitudinal direction, thereby producing a stiffness hardening effect.

As described above, a probe in the microactuator according to the present invention always approaches the same position on a medium. For the probe to read or write new information from or to the medium, the location of the medium must be changed relative to the position approached by the probe. That is, the input/output of data is controlled by the probe, while the position at which data is stored is determined by the stage microactuator. The stage microactuator is capable of moving the medium having two degrees of freedom.

The microactuator according to the present invention uses micro-electromechanical system (MEMS) techniques to be realized on a silicon wafer. Also, the microactuator is capable of actuation by applying an electrostatic force of a comb type structure.

The single-stage microactuator according to the present invention used in a storage device includes the use of a single electrode in an actuating part, thereby simplifying a fabrication process without an isolation process. Furthermore, the single-stage microactuator according to the present invention is configured stably to prevent occurrences of motion other than X-Y plane of motion due to a large stage and to maximize the area of a stage (storage area) over the total area thereof.

The single-stage microactuator according to the present invention used in a storage device is capable of multi-dimensional actuation with a single electrode in an actuating part and eliminates the need for an isolation process to simplify a fabrication process. Furthermore, the single-stage microactuator has a spring-supported structure capable of preventing occurrences of motion other than the X-Y plane of motion, even if a stage with media larger than a predetermined size is mounted. In addition, the microactuator has an effective arrangement in which the area of a stage (storage area) over the total area is maximized.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A single-stage microactuator comprising:
   a substrate;
   a fixed plate electrode disposed at a central portion of the substrate;
   a rectalinear stage having first and second side directions, said rectalinear being located above the fixed plate electrode, the second direction being perpendicular to the first direction;
   a plurality of actuating frame parts provided corresponding to the two first direction of sides and the two second direction of sides in regions surrounding the stage, wherein each actuating frame includes a plurality of actuating frames arranged parallel to a corresponding side of the stage adjacent to each surrounding region;

a plurality of comb normal directional deformable spring parts, each disposed between each side of the stage and the inner part of each actuating frame part, wherein each comb normal directional deformable spring part includes a plurality of spring members extending in a direction perpendicular to a corresponding side of the stage, a plurality of fixed frame parts, each including a plurality of fixed frames alternately arranged parallel to the plurality of actuating frames of a corresponding actuating frame part of each surrounding region; an actuating comb electrode provided in each actuating frame of the actuating frame part, the actuating comb electrode extending in a direction perpendicular to the side of the stage corresponding to each surrounding region, a fixed comb electrode arranged alternately in parallel to the actuating comb electrode in each fixed frame of the fixed frame part; and a plurality of comb directional deformable spring parts disposed on one side of each actuating frame part opposite the stage and the opposing side thereof for providing an elastic recovery force in a direction perpendicular to one side of the stage corresponding to each of the surrounding regions.

2. The single-stage microactuator of claim 1, wherein the actuating frame of each actuating frame part comprises:

a first actuating main frame arranged parallel to an adjacent side of the stage;

a plurality of actuating sub-frames arranged outwardly from the stage and spaced from and parallel to the first actuating main frame; and a plurality of second actuating main frame extending outward from the stage and connecting the first actuating main frame to the plurality of actuating sub-frames.

3. The single-stage microactuator of claim 1, wherein the fixed frame of each fixed frame part comprises:

a plurality of fixed sub-frames arranged parallel to the first actuating main frame and the plurality of actuating sub-frames; and a plurality of fixed main frames for fixing the fixed sub-frame for each region.

4. The single-stage microactuator of claim 2, wherein an area surrounding the stage is partitioned into the surrounding regions by boundary lines extending from the stage in a diagonal direction of the stage, and wherein corresponding actuating and fixed frame parts are arranged in a form corresponding to each surrounding region.

5. The single-stage microactuator of claim 3, wherein an area surrounding the stage is partitioned into the surrounding regions by boundary lines extending from the stage in a diagonal direction of the stage, and wherein corresponding actuating and fixed frame parts are arranged in a form corresponding to each surrounding region.

6. The single-stage microactuator of claim 2, wherein the plurality of second actuating main frames are arranged in a direction extending radially from the stage.

7. The single-stage microactuator of claim 3, wherein the plurality of second actuating main frames are arranged in a direction extending radially from the stage.

8. The single-stage microactuator of claim 3, wherein the plurality of fixed main frames are arranged in a direction extending radially from the stage.

9. The single-stage microactuator of claim 4, wherein the plurality of fixed main frames are arranged in a direction extending radially from the stage.

10. The single-stage microactuator of claim 6, wherein the plurality of fixed main frames are arranged in a direction extending radially from the stage.

11. The single-stage microactuator of claim 1 wherein a fixed plate electrode pad is disposed at a portion adjacent to an edge of the substrate; and wherein a line electrode extends in a diagonal direction of the substrate for connecting the fixed plate electrode pad with the fixed plate electrode.

12. The single-stage microactuator of claim 3, wherein a fixed plate electrode pad is disposed at a portion adjacent to an edge of the substrate; and wherein a line electrode extends in a diagonal direction of the substrate for connecting the fixed plate electrode pad with the fixed plate electrode.

13. The single-stage microactuator of claim 6, wherein a fixed plate electrode pad is disposed at a portion adjacent to an edge of the substrate; and wherein a line electrode extends in a diagonal direction of the substrate for connecting the fixed plate electrode pad with the fixed plate electrode.

14. The single-stage microactuator of claim 9, wherein a fixed plate electrode pad is disposed at a portion adjacent to an edge of the substrate; and wherein a line electrode extends in a diagonal direction of the substrate for connecting the fixed plate electrode pad with the fixed plate electrode.

15. The single-stage microactuator of claim 2, wherein an actuating frame electrode pad and a fixed frame electrode pad are disposed at outer ends of the second actuating main frame and the fixed main frame, respectively, for applying voltages to the actuating frame part and the fixed frame part, respectively.

16. The single-stage microactuator of claim 3, wherein an actuating frame electrode pad and a fixed frame electrode pad are disposed at outer ends of the second actuating main frame and the fixed main frame, respectively, for applying voltages to the actuating frame part and the fixed frame part, respectively.

17. The single-stage microactuator of claim 6, wherein an actuating frame electrode pad and a fixed frame electrode pad are disposed at outer ends of the second actuating main frame and the fixed main frame, respectively, for applying voltages to the actuating frame part and the fixed frame part, respectively.

18. The single-stage microactuator of claim 9, wherein an actuating frame electrode pad and a fixed frame electrode pad are disposed at outer ends of the second actuating main frame and the fixed main frame, respectively, for applying voltages to the actuating frame part and the fixed frame part, respectively.

19. The single-stage microactuator of claim 11, wherein an actuating frame electrode pad and a fixed frame electrode pad are disposed at outer ends of the second actuating main frame and the fixed main frame, respectively, for applying voltages to the actuating frame part and the fixed frame part, respectively.

20. The single-stage microactuator of claim 15, wherein an actuating frame electrode pad and a fixed frame electrode pad are disposed at outer ends of the second actuating main frame and the fixed main frame, respectively, for applying voltages to the actuating frame part and the fixed frame part, respectively.

* * * * *